US007805168B2

(12) United States Patent
Wang (10) Patent No.: US 7,805,168 B2
(45) Date of Patent: Sep. 28, 2010

(54) PORTABLE DIGITAL DEVICE FOR PROVIDING DIGITAL BROADCASTING INFORMATION THROUGH OUTER DISPLAY UNIT AND METHOD THEREOF

(75) Inventor: Houk Wang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1472 days.

(21) Appl. No.: 11/130,227

(22) Filed: May 17, 2005

(65) Prior Publication Data

US 2005/0261033 A1 Nov. 24, 2005

(30) Foreign Application Priority Data

May 21, 2004 (KR) .............. 10-2004-0036399

(51) Int. Cl.
*H04N 7/00* (2006.01)
(52) U.S. Cl. ............... 455/566; 455/556.1; 455/556.2; 455/3.05
(58) Field of Classification Search ........... 455/566, 455/556.1, 556.2, 550.1, 3.05, 418, 517; 348/838, 837, 180, 192, 193, 726, 730
See application file for complete search history.

(56) References Cited

U.S. PATENT DOCUMENTS

| 6,097,441 | A  | * | 8/2000 | Allport ............... 348/552 |
| 6,393,499 | B1 |   | 5/2002 | Chaiken et al. ......... 710/19 |
| 7,095,982 | B2 | * | 8/2006 | Mizutani ............ 455/41.2 |

| 2002/0140627 | A1 |   | 10/2002 | Ohki et al. ............... 345/1.1 |
| 2002/0151271 | A1 | * | 10/2002 | Tatsuji et al. ............ 455/3.05 |

FOREIGN PATENT DOCUMENTS

| CN | 1430851 A      | 7/2003  |
| EP | 0 564 092      | 10/1993 |
| EP | 0 784 400      | 7/1997  |
| EP | 1408673 A2     | 4/2004  |
| KR | 1999-0015114   | 5/1999  |
| KR | 10-0337604     | 4/2000  |
| KR | 2002-0065779   | 8/2002  |
| KR | 20-0316616     | 6/2003  |
| KR | 10-2005-0025789| 3/2005  |
| WO | WO 01/91458    | 11/2001 |

OTHER PUBLICATIONS

European Office Action dated Dec. 18, 2009 in corresponding European Patent Application No. 05104288.5.

* cited by examiner

*Primary Examiner*—Melur Ramakrishnaiah
(74) *Attorney, Agent, or Firm*—Staas & Halsey LLP

(57) ABSTRACT

A portable digital device includes: a digital broadcast receiving unit receiving digital broadcasting information; a first display unit outputting the received digital broadcasting information; a first input unit controlling the first display unit; a second display unit, separated from the first display unit, outputting the received digital broadcasting information; a second input unit controlling the second display unit; and a digital broadcasting data converting unit converting the received digital broadcasting information for display on the first display unit or the second display unit and providing the converted digital broadcasting information to the first display unit or the second display unit.

18 Claims, 10 Drawing Sheets

PORTABLE DIGITAL DEVICE FOR PROVIDING DIGITAL BROADCASTING INFORMATION THROUGH OUTER DISPLAY UNIT AND METHOD THEREOF

CROSS-REFERENCE TO RELATED APPLICATION

This application claims priority from Korean Patent Application No. 2004-0036399 filed on May 21, 2004 in the Korean Intellectual Property Office, the disclosure of which is incorporated herein by reference.

BACKGROUND OF THE INVENTION

1. Field of the Invention

The present invention relates to a portable digital device for providing digital broadcasting information through an outer display unit of the apparatus and a method thereof.

2. Description of Related Art

Recently, with the increasing research into wireless Internet technology, the mobility of portable digital devices such as notebook computers, laptop computers, PDAs (personal digital assistant), etc., which have gradually made inroads into markets for desktop computers, has become the center of attention. As the display performance of notebook computers, among other devices, gradually increases, portable digital devices do not fall behind desktop computers any more in expressing multimedia information. Accordingly, the combination of a portable digital device and multimedia technology has become an important issue in the markets for portable digital devices.

Also, with a growing interest in digital broadcasting, researches for practical use of DMB (Digital Multimedia Broadcasting) and DAB (Digital Audio Broadcasting) have been continuously made. DMB is a digital type multimedia broadcasting that can provide sound quality equal to that of a CD, data or video service with a superior fixed/mobile receiving quality. DMB may be divided into a terrestrial signal DMB that uses a terrestrial signal as a transmission means, and a satellite DMB that uses a satellite as a transmission means. The important attributes of DMB are 'multichannel', 'multimedia', and 'mobility'. The portable computer such as a notebook computer, laptop computer and tablet computer, and the portable digital device such as a PDA, cellular phone, etc., have been spotlighted as important products in the fields of DMB and DAB, which satisfy the mobility that the DMB receiver should have and provide diverse multimedia information.

EMA (Extended Mobile Access) is one of functions of a mobile Internet PC proposed by Intel Corporation, and is one of new use models. The EMA is a technique which makes it possible to perform simple works even in a state that the portable digital device is shut. SNS (Simplified Network Selection) is a technique for improving the accessibility of the notebook computer and automatically makes the notebook computer launch onto a network. LBC (Location-Based Computing) indicates the location of the notebook computer for location-based services, and makes it possible to use various applications based on this location information.

The EMA technique, which has been proposed as a technique that can be combined with the portable digital device, makes it possible to use the functions of the portable digital device even in a state that a main display unit of the portable digital device is off or not in use. However, the corresponding techniques proposed up to now are merely for confirming mails or schedules, and cannot keep pace with the recent techniques related to improved portable digital devices. As the reception of digital broadcasts through a notebook computer, laptop computer, etc., becomes an important function of the portable digital device, it causes a problem to wholly operate the portable digital device only for the reception of the digital broadcasts. For example, it causes a problem in power consumption and inconvenience in use to completely operate the portable digital device even if the user only intends to listen to a digital broadcast by obtaining sound information during movement of the portable digital device. Accordingly, it is necessary to provide an apparatus for easily listening to and adjusting digital broadcasts in a portable digital device as the power consumption and the inconvenience in use are reduced.

Korean Utility Model Unexamined Publication No. 1999-0015114 discusses an auxiliary display unit is provided on the outside of a portable computer to display a playback state of a DVD being executed by the portable computer. Korean Patent No. 10-0337604 discusses an internal operation state of the computer such as a present state of power supply. However, these functions simply relate to connections with the playback function or the internal state of the computer, but they have problems in using digital broadcasting information.

Accordingly, there is a need to solve the above-mentioned problems by providing a portable digital device for providing digital broadcasting information through an outer display unit of the apparatus and a method thereof which can receive or confirm digital broadcasting (i.e., DAB and DMB) information through the outer display unit of the apparatus.

BRIEF SUMMARY

An aspect of the present invention is to provide a portable digital device for providing digital broadcasting information through an outer display unit of the apparatus and a method thereof which makes it possible to catch, select and change digital broadcasts even in a state that a main display unit of the portable digital device is not in use, and can use information delivered through digital broadcasting channels.

Another aspect of the present invention is to provide a portable digital device for providing digital broadcasting information through an outer display unit of the apparatus and a method thereof which can efficiently manage a power supply of the portable digital device by making it possible to receive and select the digital broadcasting information without driving the whole power of the portable digital device.

In accordance with an aspect of the present invention, there is provided a portable digital device for providing digital broadcasting information through an outer display unit, including: a digital broadcast receiving unit receiving digital broadcasting information; a first display unit outputting the received digital broadcasting information; a first input unit controlling the first display unit; a second display unit, separated from the first display unit, outputting the received digital broadcasting information; a second input unit controlling the second display unit; and a digital broadcasting data converting unit converting the received digital broadcasting information for display on the first display unit or the second display unit and providing the converted digital broadcasting information to the first display unit or the second display unit.

In accordance with another aspect of the present invention, there is provided a method of providing digital broadcasting information through an outer display unit, including: receiving digital broadcasting information; converting the received digital broadcasting information for display on display units;

and providing the converted digital broadcasting information to a first display unit or a second display unit that is separated from the first display unit.

In accordance with another aspect of the present invention, there is provided a method of obtaining digital broadcasting information through an outer display of a device, including: receiving a mode change request to a mode of an outer display control unit; informing a Digital Multimedia Broadcasting/Digital Audio Broadcasting (DAB/DMB) control unit of a mode change according to the mode change request by transmitting to the DAB/DMB control unit a navigation code; generating and transmitting output data for the navigation code to the outer display control unit; displaying, after the generating and transmitting, the output data via a outer display; determining, after the displaying, whether a button is input within a specified time period, determining whether the input button is an end button when the button is input within the specified amount of time, generating and transmitting another navigation code to the DAB/DMB control unit when the input button is not the end button; and performing a function corresponding to the navigation code and repeating the generating and transmitting. When no button is input within the specified time or the button is the end button, the method terminates.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Several terms to be mentioned in the following description are defined as follows.

As used herein, EMA (Extended Mobile Access) is a technique which makes it possible to use the function of a portable digital device such as a notebook computer even in a state that a main display unit of the portable digital device is not in use, for example, if the portable digital device is shut. EMA is originated from Intel Corporation. Although an outer display unit to be explained hereinafter has a similar characteristic to the EMA technique, it is not limited to the EMA technique proposed by Intel Corporation.

As used herein, a digital device is an device having digital circuits for processing digital data, and may be a computer, printer, scanner, phaser, digital camera, facsimile machine, digital copier, PDA, cellular phone, digital home appliance, digital phone, digital project, home server, digital video recorder, digital TV broadcasting receiver, digital satellite broadcasting receiver, set top box, etc. A portable digital device is a computer having the mobility and portability such as a notebook computer, laptop computer, etc., and diverse kinds and forms of portable digital devices have been commercialized in the market with the appearance of PDAs and HPCs (Hand-held PCs). Also, in addition to the existing notebook computers, mini notebook computers and sub notebook computers having diverse forms and use purposes have been commercialized. In the embodiment of the present invention, a notebook computer that is the primary one of the portable digital devices has been taken as an example, but the present invention is not limited to the notebook computer.

In the present embodiment, a main display unit of the portable digital device is called an inner display unit, and a display unit mounted or implemented in an area other than a main display area is called an outer display unit. In the case of an opening/shutting type, i.e., folder type, portable digital device, the inner display unit can be seen only when the portable digital device is opened. However, the present invention is not limited to such an opening/shutting type portable digital device.

For example, in the case of the existing notebook computer, an LCD screen of the notebook computer may correspond to an inner display unit, and a screen mounted on an outer panel of the notebook computer in a state that the notebook computer is shut may correspond to an outer display unit. In the case of a cellular phone, a display unit mounted inside the cellular phone, which shows the most information and has the largest display unit, may correspond to a main display unit, and a display unit other than the main display unit, which is mounted outside the cellular phone, may correspond to an outer display unit. Meanwhile, the inner display unit and the outer display unit may be installed on the same side of the cellular phone. In the present invention, the digital broadcasting information can be received through the outer display unit, being separated from the inner display unit, but it is not always necessary to mount the inner display unit and the outer display unit on different sides of the cellular phone.

Figure 1:
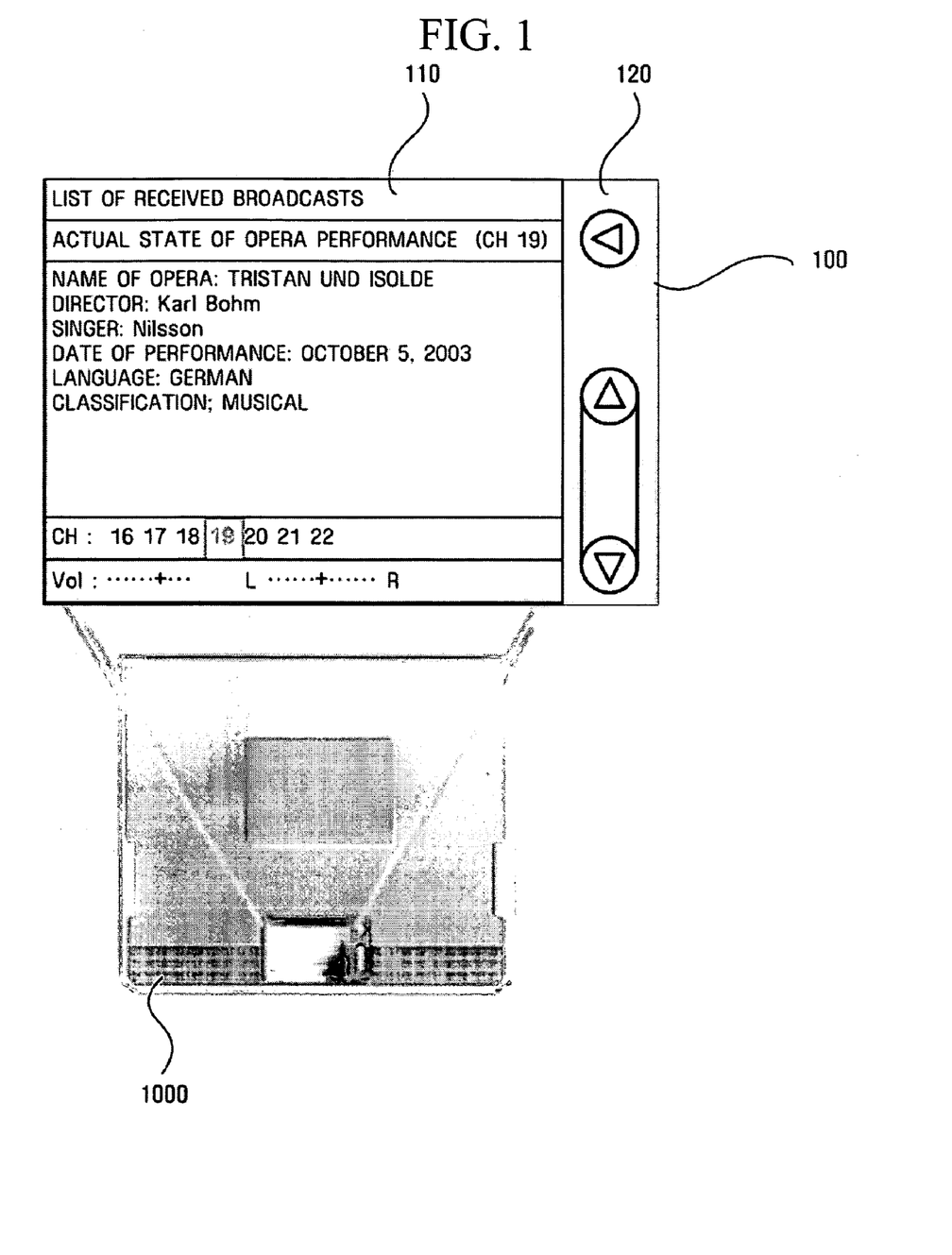
FIG. 1 is a view illustrating an example of an outer display control unit related to digital broadcasts that is implemented on the outside of a notebook computer according to an embodiment of the present invention.

FIG. 1 is a view illustrating an example of an outer display control unit related to digital broadcasts that is implemented on the outside of a notebook computer according to an embodiment of the present invention. Referring to FIG. 1, a small outer display unit 110, which displays music broadcasting information, is provided on the outside of the notebook computer 1000. A digital broadcasting signal includes broadcasting information in addition to multimedia information. For example, in the case of a music broadcast, it carries a title, words, singer, album information, etc. The digital broadcasting signal also includes information about a TMC (Traffic Message Channel), weather, security, travel, exchange rate, broadcasting station, etc., which are transferred through a separate data channel, in addition to the multimedia information and audio broadcasting streams. Although FIG. 1 illustrates only the music broadcast, a user can confirm diverse information received through the digital broadcasting channel through the outer display unit 110, and based on this, the user can select another broadcast or change sound information such as volume through an outer input unit 120. Also, the user can obtain traffic information, weather, and security information, which are delivered through the data channel, through the outer display unit 110 in a state that the notebook computer is not opened. In addition, calendar information, mail and alarm function are also available through the outer display unit 110.

Although an embodiment of the present invention has been described with reference to FIG. 1, it is to be understood that the present embodiment is not limited to this exemplary figure. Rather, the digital broadcasting information may be outputted to the outer display unit automatically or by scheduling in association with the reception of broadcasts through combination of software or hardware in the notebook computer.

Figure 2:
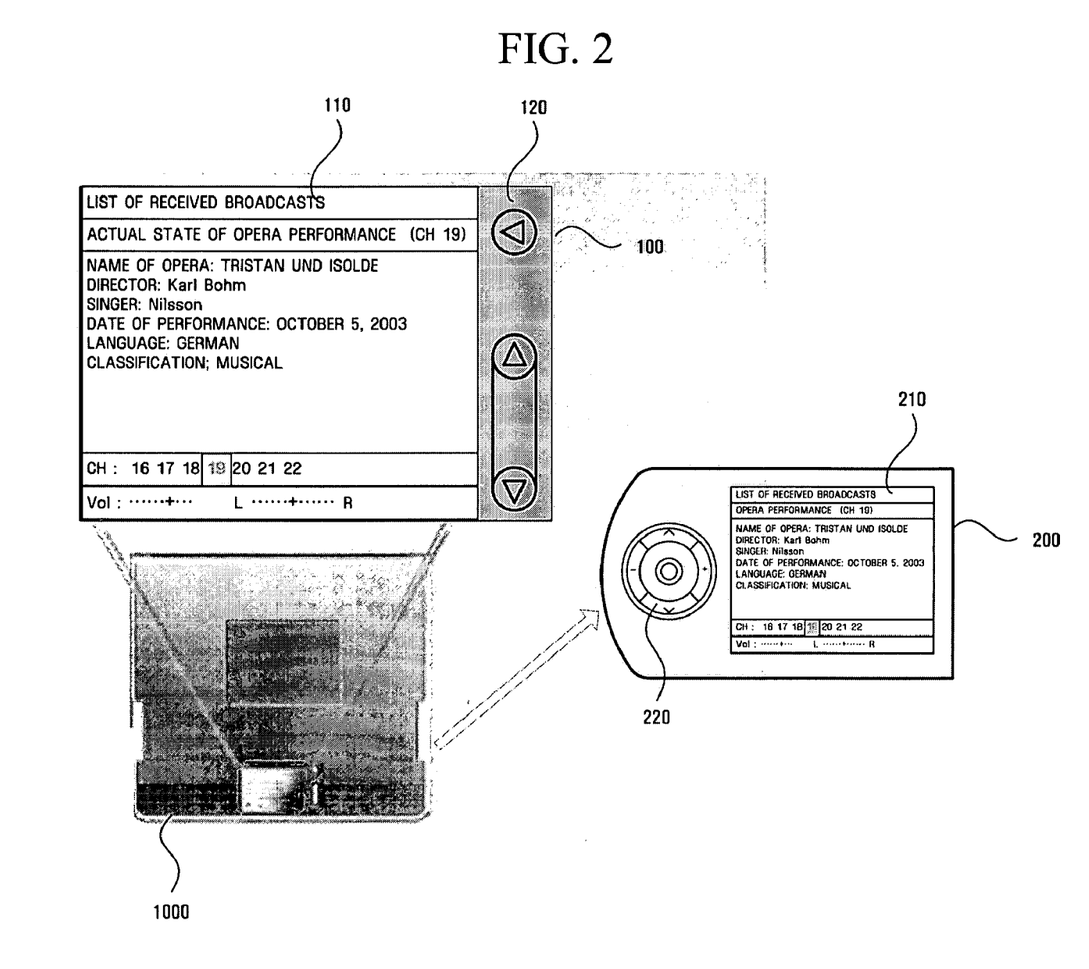
FIG. 2 is a view illustrating an example of an outer display control unit related to digital broadcasts that is implemented on a remote controller according to an embodiment of the present invention.

FIG. 2 is a view illustrating an example of an outer display control unit related to digital broadcasts that is implemented on a remote controller according to an embodiment of the present invention. The digital broadcasting information can be used not only through the outer display control unit attached to the outside of the notebook computer 1000 as shown in FIG. 1 but also through a remote controller as shown in FIG. 2.

Referring to FIG. 2, the remote controller 200 for a remote control is connected to the notebook computer by wireless. In the case of the past portable digital device, a remote controller was connected to the portable digital device by wire. However, as the technology of wireless communications among peripheral devices is improved, wireless communication protocols such as Bluetooth, HomeRF (home radio frequency), etc., have been proposed. Bluetooth is a low-power-consumed and low-priced short-distance wireless communication technology which makes it possible to communicate among diverse appliances at a distance of less than 10 m. However, its application range was restricted at its initial stage. Recently, as its function is expanded, Bluetooth is in the spotlight as a PAN (Personal Area Network) technology among personal communication appliances such as mobile phone terminal, PDA, etc., PC peripheral devices such as head sets, keyboards, speakers and printers, and appliances connected to a PC by wire. As one of the representatives of the next-generation network technology, Bluetooth has a maximum transmission speed of 1 Mbps among appliances at a distance of less than 10 m. However, a 10 Mbps version is now under development, and a replacement of wire USB function and a new application in mobile products are expected. Although its module price is relatively high, it is expected that the Bluetooth wireless technology will grow in the fields of hand set or head set.

Bluetooth wireless technology provides a mechanism for forming a private ad-hoc grouping of connected devices that are far apart from a fixed network-based scheme. Bluetooth forms a difference between a master unit and a slave unit in the same network segment, and the master unit is a device of which the clock and hopping sequence are used to synchronize all other devices. A query-based discovery scheme is used to find Bluetooth devices with unknown addresses. Queries are also concentrated upon a registration server.

HomeRF based on a SWAP (Shared Wireless Access Protocol) is another example of operational environments that can be used to connect devices. HomeRF Working Group provides a basis for wide-ranged consumer devices, allowing wireless digital communications between a PC and a consumer device. The working group, which includes companies that lead industries of personal computers, consumer electronic appliances, peripheral devices, communications, software and semiconductors, are now developing the standard called SWAP for wireless communications at home. The HomeRF SWAP system is devised to perform both sound and data communications and to mutually operate a public switched telephone network (PSTN) and an Internet. This system operates in a band of 2400 MHz, and uses a digital frequency hopping a band-spread signal. The SWAP technology originates from a wireless LAN technology that enables new kinds of wireless phones (i.e., DECT) and wireless phone services for home use. The SWAP technology supports a TDMA (Time Division Multiple Access) service for providing delivery of a time-critical service such as an interactive sound and a CSMA/CA (Carrier Sense Multiple Access/Collision Avoidance) service for delivery of a high-speed packet data. The SWAP system can operate as an ad-hoc network or a managed network under the control of a connection point. In an ad-hoc network that supports only data communications, all stations are equal, and the network control is distributed among stations. The connection point, which provides a gateway to the PSTN in the time-critical communication such as the interactive sound, is required to harmonize the system. The station uses the CSMA/CA in communicating with the connection point or another station. Further detailed technology can be obtained from http://www.homerf.org, the web site of the Home Radio Frequency Working Group. SWAP Standard 1.0 is a reference bibliography. Although it aims to construct a network at home using an RF signal, not infrared rays, it has a drawback in that it has a somewhat low speed of 1-2 Mbps and its speed is reduced according to the number of connected appliances. According to a new standard, however, it is planned to improve its transmission speed to the 10 Mbps class. In the same manner as 802.11b or Bluetooth, the SWAP Standard 1.0 uses a band of 2.4 GHz, and makes it possible to connect up to 127 appliances. The remote controller and the portable digital device can perform communications with each other using Bluetooth, HomeRF, etc.

There are several protocols and techniques that make communications between at least two devices possible. In the present embodiment of the present invention, the Bluetooth wireless technology and the HomeRF technology are used as wireless communication technology. The remote controller as described above can communicate with the portable digital device by wire or wireless methods.

A remote display unit 210 displays information received from the notebook computer, and a remote input unit generates and transfers a selection signal for selecting the information to the notebook computer. As was explained with reference to FIG. 1, the information shown through the remote display unit 210 may be information about digital broadcasts and information delivered through a data channel.

Hereinafter, an outer display control unit to be implemented according to an embodiment of the present invention and a digital broadcasting control unit that operates in association with the outer display control unit will be explained.

In the present embodiment of the present invention, terms in the form of unit or module, mean software or hardware constituent elements such as, by way of non-limiting examples, a field-programmable gate array (FPGA) or an application-specific integrated circuit (ASIC). However, the module is not limited to the software or hardware. The module may be constructed so as to be in a storage medium that can be addressed or to execute one or more processors. For example, the module includes constituent elements such as software constituent elements, object-oriented software constituent elements, class constituent elements and task constituent elements, processes, functions, attributes, procedures, subroutines, segments of program codes, drivers, firmware, micro-codes, circuitry, data, databases, data structures, tables, arrays and variables. The constituent elements and functions provided in the modules may be combined together to form a smaller number of modules, or may be divided into additional modules. In addition, the constituent elements and modules may be implemented so as to execute one or more CPUs in a device or security multimedia card.

Figure 3:
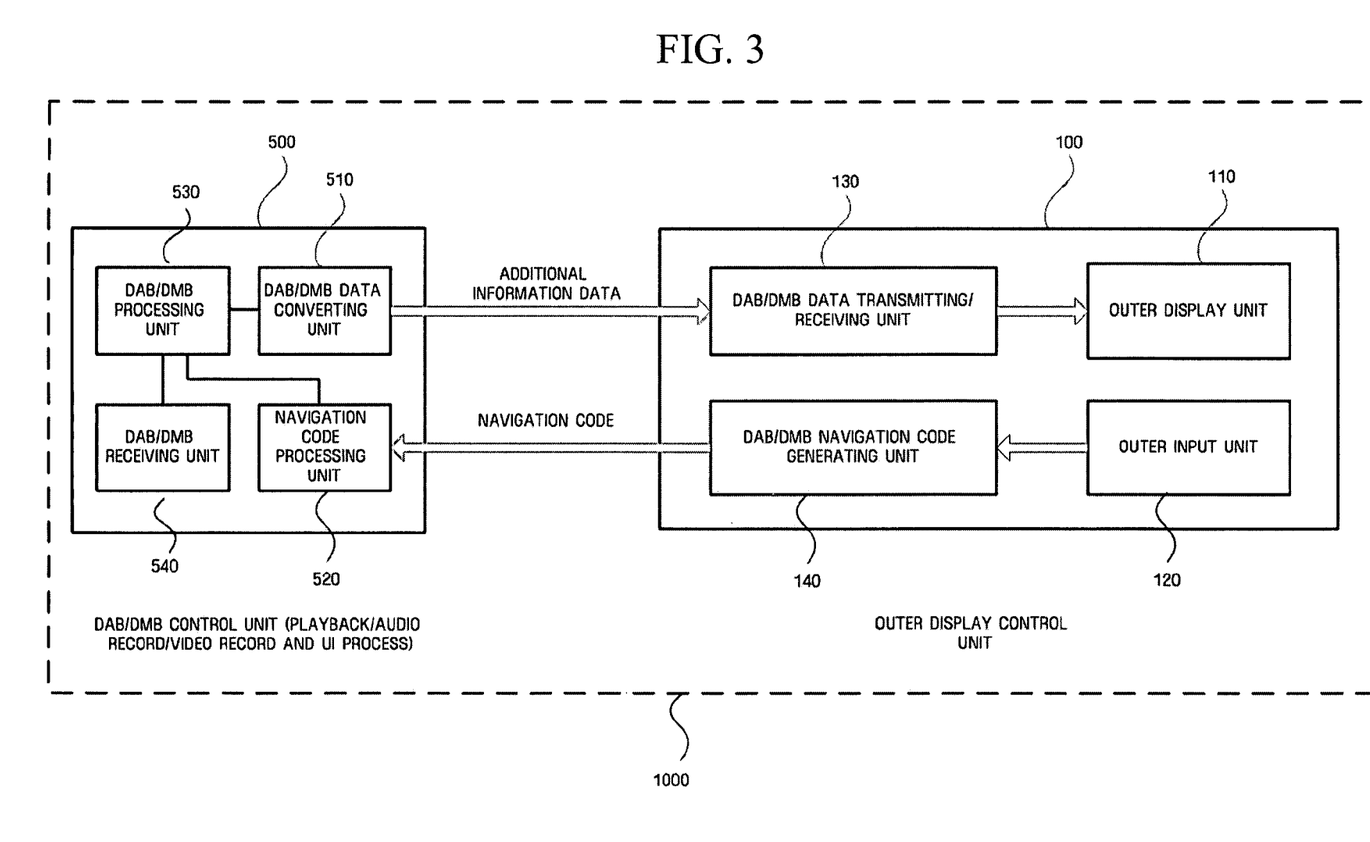
FIG. 3 is a block diagram illustrating the relationship between an outer display control unit mounted on the outside of a notebook computer and a digital broadcasting control unit inside the notebook computer according to an embodiment of the present invention.

FIG. 3 is a block diagram illustrating the relationship between an outer display control unit mounted on the outside of a notebook computer and a digital broadcasting control unit inside the notebook computer according to an embodiment of the present invention. FIG. 3 shows the relationship between an outer display control unit 100 mounted on the outside of a notebook computer 1000 and a DAB/DMB control unit 500 inside the notebook computer. The outer display control unit 100 includes four parts: an outer display unit 110 for outputting information to a user, an outer input unit 120 for receiving an input signal for selection/change from the user, a DAB/DMB data transmitting/receiving unit 130 for receiving digital-broadcasting-related data from the notebook computer and transmitting the data to the outer display unit, and a DAB/DMB navigation code generating unit 140 for generating a navigation code that can be processed by the DAB/DMB control unit if the user generates the input signal related to a selection of broadcasts, volume adjustment, selection of digital data channel information, etc., through the outer input 120.

The DAB/DMB data transmitting/receiving unit 130 receives the information about the digital broadcasts delivered to the notebook computer 1000. The received information is to be outputted to the outer display unit. For example, the information may include: 1) broadcasting channel information for the selection of broadcasts; 2) program information being presently broadcast such as a channel name, broadcasting time, music name, volume, etc.; or 3) traffic information, weather, security market information, exchange rate, broadcasting station information, etc., delivered through the data channel.

Since the outer display unit has a limited size, it is difficult to output information received through the digital broadcasting to the outer display unit as it is. In the present embodiment, the DAB/DMB control unit 500, which processes the digital broadcasts in the notebook computer 1000, converts and provides data to match the outer display unit 110, and the DAB/DMB data transmitting/receiving unit 130 receives and transmits the converted information data to the outer display unit 110. The outer display unit 110, which outputs the information to the user, may comprise a liquid crystal display (LCD) widely used as a display screen of the notebook computer or an organic electroluminescent (EL) recently proposed as a display medium.

The outer input unit 120 is an input device such as buttons or a touch screen, and the user generates an input signal for using the DAB/DMB information through the outer input unit 120. For example, the input signal generated by the user may refer to: 1) switchover to a DAB/DMB mode in order to see the DAB/DMB information through the outer display unit 110; 2) selection of broadcasting programs arranged on the outer display unit 110; 3) volume adjustment; or 4) selection/confirmation of the information delivered through the data channel. Although the outer input unit can be implemented through the buttons as shown in FIG. 1, it may also be implemented by adding a touch screen function to the outer display unit 110, or through an input appliance remotely controlled.

If the outer input unit 120 generates the input signal, the DAB/DMB navigation code generating unit 140 converts the input signal into a code (i.e., navigation code) that accommodated by the DAB/DMB control unit 500 in the notebook computer 1000. For example, 1) if a mode change button (or start button) is pressed in a state that the outer display unit 110 is not in a DAB/DMB mode, the DAB/DMB navigation code generating unit 140 can generate a navigation code for requesting to generate and send DAB/DMB initial data; 2) if a volume is adjusted or a channel is changed while a specified broadcast is received, it can generate a code for a volume change or channel change; and 3) if a user inputs a request for detailed information of specified information through a button manipulation or touch screen in a state that information delivered through the data channel of the digital broadcast is briefly displayed, it can generate a navigation code for requesting the detailed information of the corresponding information. The navigation code generated as above is delivered to the DAB/DMB control unit 500 in the notebook computer.

Next, a DAB/DMB process performed in the notebook computer 1000 will be explained. The DAB/DMB control unit 500 briefly includes a DAB/DMB data converting unit 510, a navigation code processing unit 520, a DAB/DMB processing unit 530, and a DAB/DMB receiving unit 540. The DAB/DMB receiving unit 540 receives digital broadcasts delivered through a satellite or ground relay station. The received broadcasts include various kinds of information through the data channel in addition to broadcasting programs. The DAB/DMB processing unit 530 selects a delivered digital broadcasting signal or a specified data signal. Also, the DAB/DMB processing unit may request the DAB/DMB receiving unit 540 to receive a specified channel broadcast.

While the DAB/DMB processing unit 530 and the DAB/DMB receiving unit 540 receive and process the digital broadcasts, the DAB/DMB data converting unit 510 and the navigation code processing unit 520 transmit/receive data directly to/from the outer display unit 100. The DAB/DMB data converting unit 510 converts the received broadcasting signal into digital broadcasting information to be displayed on the outer display unit 110. Since the outer display unit 110 should display information in a small screen unlike the main display unit, it requires only a part of the digital broadcasting information, and needs to show UI information for selecting the information. Accordingly, the DAB/DMB data converting unit 510 converts the digital broadcasting information processed by the DAB/DMB processing unit 530. The converted data is delivered to the DAB/DMB data transmitting/receiving unit 130 of the outer display control unit 100, and is displayed through the outer display unit 110.

The navigation code processing unit 520 receives the navigation code transmitted from the DAB/DMB navigation code generating unit 140 of the outer display control unit 100, and transmits the navigation code to the DAB/DMB processing unit 530. The navigation code, which is generated from the DAB/DMB navigation code generating unit 140, refers to user's requests such as requests for mode change, broadcast change, volume adjustment, etc. The navigation code processing unit 520 sends the navigation code to the DAB/DMB processing unit 530, and the DAB/DMB processing unit 530 changes the broadcast or delivers the digital data information to the DAB/DMB data converting unit 510 according to the code. If needed, the DAB/DMB data converting unit 510 converts again the data and delivers the converted data to the outer display control unit 100.

Figure 4:
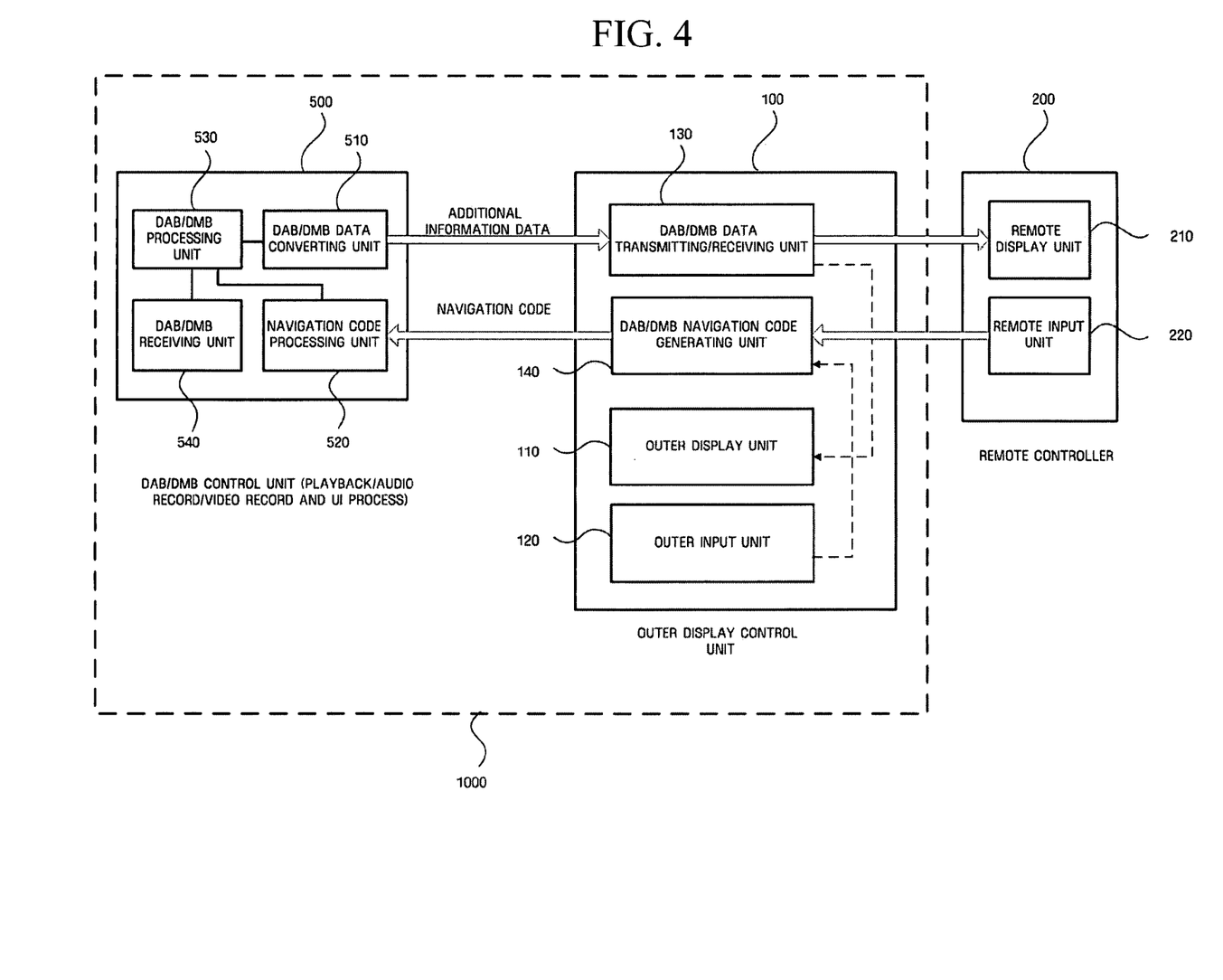
FIG. 4 is a block diagram illustrating the construction of the notebook computer of FIG. 3 and a remote controller according to an embodiment of the present invention.

FIG. 4 is a block diagram illustrating the construction of the notebook computer of FIG. 3 and a remote controller according to an embodiment of the present invention. Referring to FIG. 4, the outer display control unit 100 and the DAB/DMB control unit 500 have the same construction as those in FIG. 3, but the function of the outer display control unit 100 is performed by a remote controller 200. The remote controller 200 includes a remote display unit 210 for displaying information and a remote input unit 220. The remote display unit 210 receives and displays data transmitted from the DAB/DMB data transmitting/receiving unit 130 of the outer display control unit 100. The remote input unit 220 receives and transmits a user's input to the DAB/DMB navigation code generating unit 140. The DAB/DMB navigation code generating unit 140 transmits the navigation code to the DAB/DMB control unit 500 in the same manner as described above with reference to FIG. 3. The remote controller 200 of FIG. 4 includes only the remote display unit 210 and the remote input unit 220, and the exchange of information is performed through the outer display control unit 100. However, the remote controller 200 may directly exchange data with the DAB/DMB control unit 500 through the DAB/DMB data transmitting/receiving unit 130 and the DAB/DMB navigation code generating unit 140.

Figure 5:
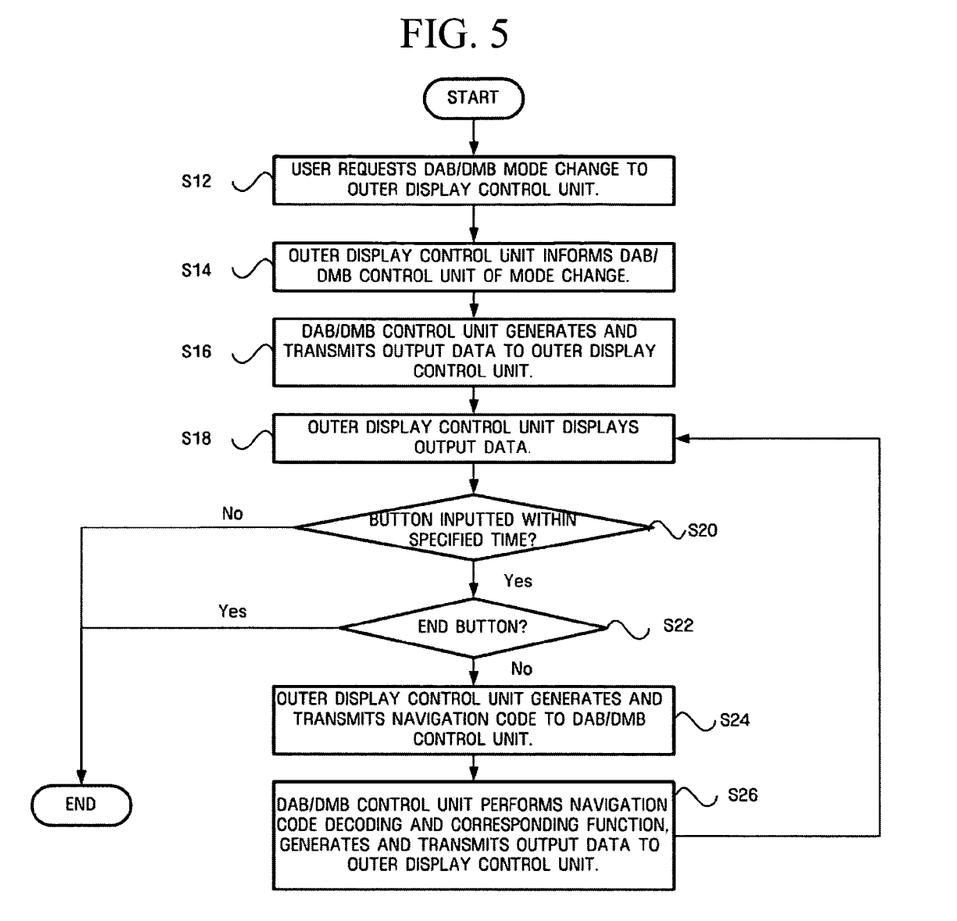
FIG. 5 is a flowchart illustrating a process of obtaining digital broadcasting information through an outer display control unit according to an embodiment of the present invention.

FIG. 5 is a flowchart illustrating a process of obtaining digital broadcasting information through an outer display control unit according to an embodiment of the present invention. Referring to FIG. 5, the user requests a mode change to the outer display control unit 100 (operation S12). As described above, this can be performed through a button manipulation, touch screen, remote controller, etc., and also at a time set by an internal timer. According to the request, the outer display control unit 100 informs the DAB/DMB control unit 500 of the mode change (operation S14), which is performed by transmitting the navigation code. The DAB/DMB control unit 500, which has received the navigation code, generates output data for the navigation code, and transmits the output data to the outer display control unit 100 (operation S16). This information may be broadcasting information or data included in the broadcasting signal. The outer display control unit 100 outputs the received output data to the outer display unit 110 (operation S18). If the user sees the output data and inputs a button within a specified time (operation S20), it is detected whether the inputted button is an end button (operation S22). If no button is inputted within the specified time, the process is automatically terminated. The process may also be terminated through the input of the end button. Meanwhile, if another button that is not the end button is pressed, the outer display control unit generates and transmits the navigation code to the DAB/DMB control unit (operation S24). Then, the DAB/DMB control unit decodes this code, and generates and transmits the output data to the outer display control unit (operation S26). Then, the outer display control unit displays the output data through the outer display unit (operation S18), and enters into a standby mode for waiting for a button input. Also, in operations S20 and S22, when the button is not inputted within the specified time or the end button is inputted, respectively, the process ends.

Figure 6:
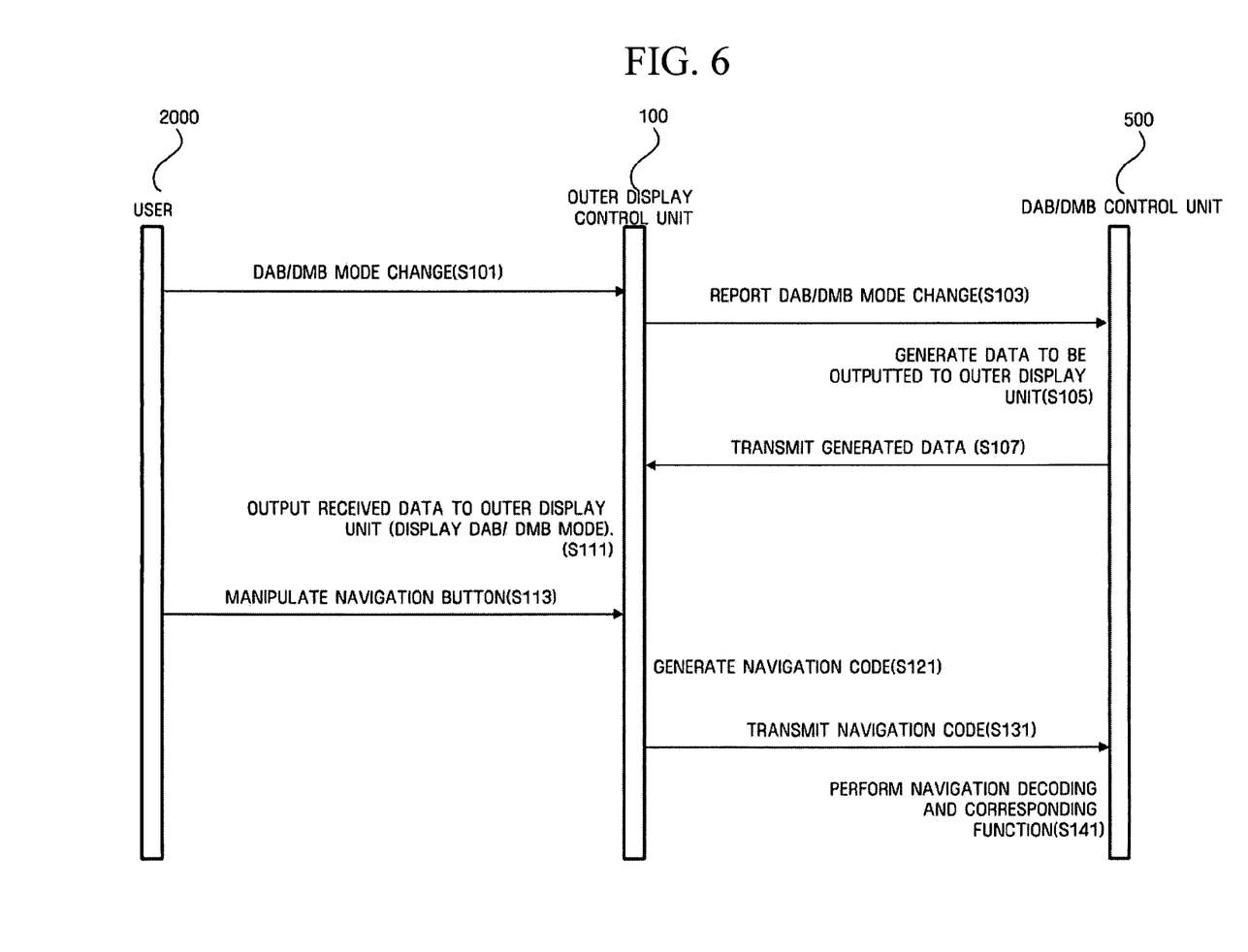
FIG. 6 is a flowchart illustrating a mutual operation process of an outer display control unit and a digital broadcasting control unit according to an embodiment of the present invention.

FIG. 6 shows how the outer display control unit 100 operates. The user presses a button for a DAB/DMB mode change (operation S101). Referring to FIGS. 4 an 6, if a specified time for automatically performing the mode change is set, or if it is scheduled to perform the mode change when a specified broadcast is received, the mode change is automatically performed at that time. The outer display control unit 100, which has received the mode change signal, converts the mode change signal into a navigation code, and delivers the navigation code to the DAB/DMB control unit 500 (operation S103). The DAB/DMB control unit 500, which has received the navigation code, generates data to be outputted to the outer display control unit 100 (operation S105). As described above with reference to FIG. 3, the output data may be information about a broadcast being currently received, selection menu for starting the broadcasting program, data transmitted through the digital broadcasting signal, etc. The outer display control unit 100 displays the received data so that the user can see the data (operation S11). The user creates a signal for requesting additional information about the digital broadcasting through the input unit of the outer display control unit 100, for example, through a direction button, selection button or touch screen, on the basis of the outputted information (operation S113). The navigation code generating unit of the outer display control unit 100 receives this signal, and generates the navigation code (operation S121). The DAB/DMB control unit 500 receives the navigation code from the navigation code generating unit (operation S131), and performs a function corresponding to the code (operation S141).

Figure 7:
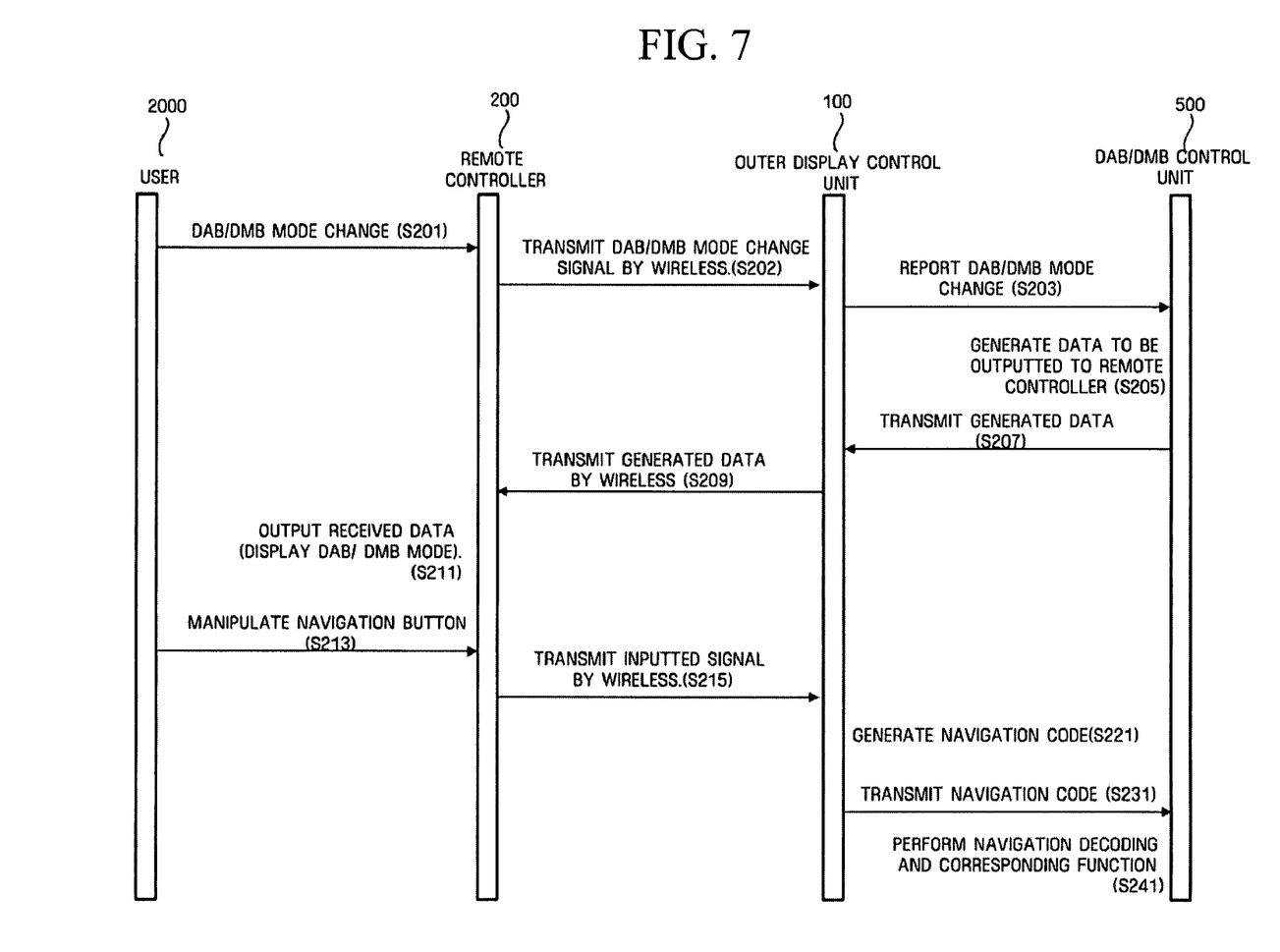
FIG. 7 is a flowchart illustrating a mutual operation process of a remote controller and a digital broadcasting control unit according to an embodiment of the present invention.

FIG. 7 is a flowchart illustrating a mutual operation process of a remote controller and a digital broadcasting control unit according to an embodiment of the present invention. Referring to FIGS. 4 and 7, the remote controller includes the remote display unit 210 for displaying the information and the remote input unit 220 for receiving the user's input signal. The DAB/DMB data transmitting/receiving unit 130 of the outer display control unit 100 receives the data to be outputted to the remote display unit, and transmits the data by wireless communication. The DAB/DMB navigation code generating unit 140 existing in the outer display control unit 100 receives the input signal from the remote input unit 220 by wireless communication, generates and delivers the navigation code to the DAB/DMB control unit. As described above with reference to FIG. 4, the remote controller, in which the DAB/DMB data transmitting/receiving unit 130 and the DAB/DMB navigation code generating unit 140 are mounted, may directly perform a wireless communication with the portable digital device without performing a wireless communication with the outer display unit. In this case, the remote controller will follow the operation process as shown in FIG. 5 since the outer display control unit 100 is constructed and operated as an independent device. However, the data transmission can be performed by wireless communication.

The user presses a button of the remote input unit to perform the DAB/DMB mode change (operation S201). If a specified time for automatically performing the mode change is set, or if it is scheduled to perform the mode change when a specified broadcast is received, the mode change is automatically performed at that time. The remote input unit, which has received the mode change signal, transmits the mode change signal to the outer display control unit 100 by wireless (operation S202). The outer display control unit 100 converts the received mode change signal into the navigation code, and delivers the navigation code to the DAB/DMB control unit 500 (operation S203). The DAB/DMB control unit 500, which has received the navigation code, generates data to be outputted to the outer display control unit 100 (operation S205). As described above, the output data may be information about a program being currently broadcast, selection menu for starting the broadcasting program, data transmitted through the digital broadcasting signal, etc. The outer display control unit receives the generated data (operation S207), and transmits the received data to the remote controller 200 by wireless (or by wire) (operation S209). The remote controller 200, which has received the output data, displays the received data so that the user can see the data (operation S211). The user creates a signal for requesting additional information about the digital broadcasting through an input unit of the remote controller 200, for example, through a direction button, selection button or touch screen, on the basis of the outputted information (operation S213). The navigation code generating unit of the outer display control unit 100 receives this signal by wireless communication and so on (operation S215), and generates the navigation code corresponding to the received signal (operation S221). The DAB/DMB control unit 500 receives the navigation code from the navigation code generating unit (operation S231), and performs a function corresponding to the code by decoding the code (operation S241).

Figure 8:
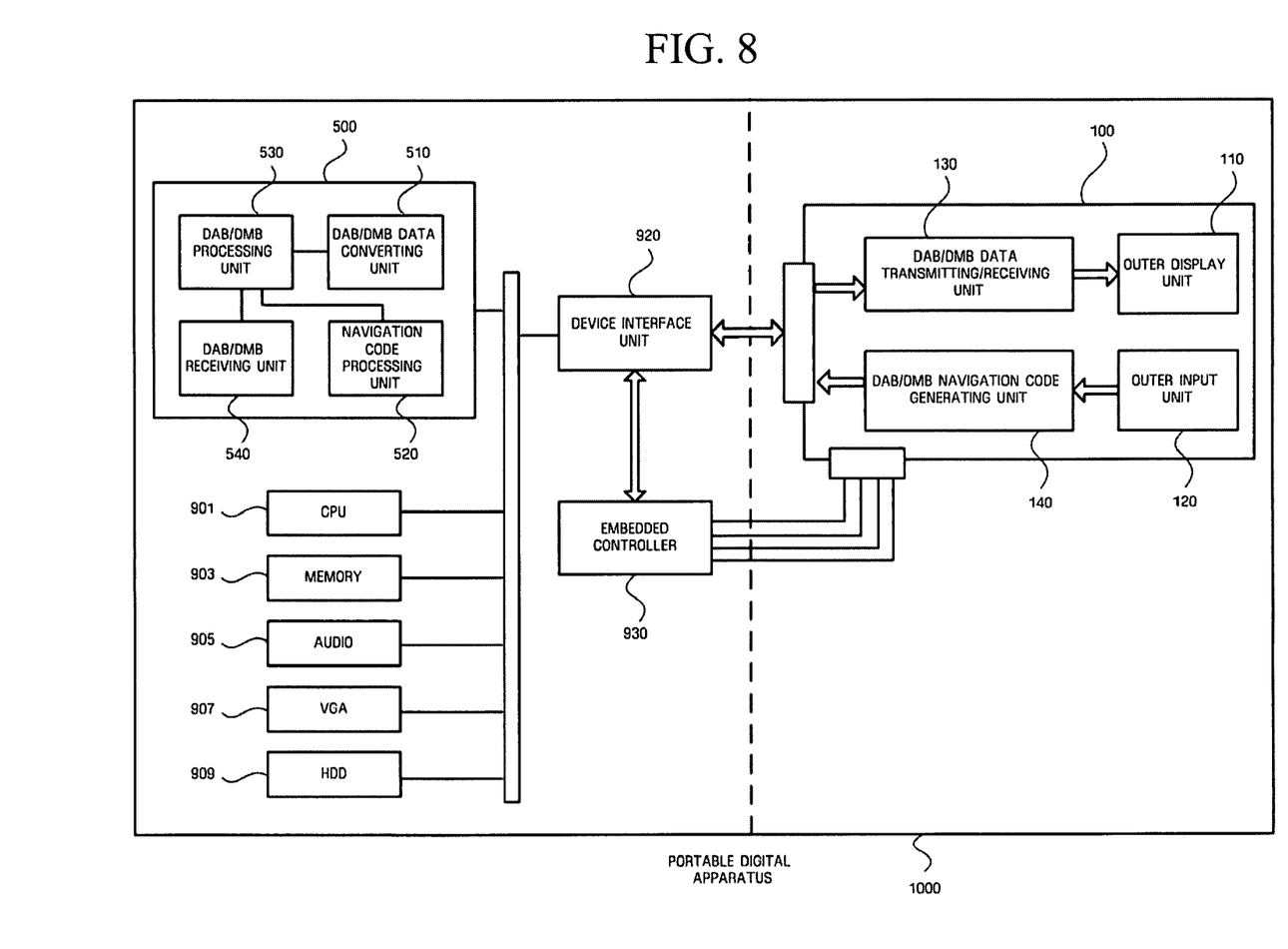
FIG. 8 is a block diagram illustrating the construction of a portable digital device according to an embodiment of the present invention.

FIG. 8 is a block diagram illustrating the construction of a portable digital device 1000 having the outer display control unit 100 and the DAB/DMB control unit 500 according to an embodiment of the present invention. The DAB/DMB control unit 500 is located inside the portable digital device 1000, and exchanges data with other constituent elements of the portable digital device 1000, for example, a central processing unit (CPU) 901, memory 903, audio 905, a video graphics array (VGA) 907, and a hard disk drive (HDD) 909. The digital broadcasting information received by the DAB/DMB control unit 500 may be outputted to a screen or speaker of the portable digital device 1000, or may be stored in the HDD 909 that is a storage medium of the portable digital device 1000. Meanwhile, a device interface unit 920 serves to exchange information between an outer device and a device inside the portable digital device 1000, and through this, the outer display control unit 100 can receive internal data of the portable digital device 1000. The device interface unit 920 receives the data generated by the DAB/DMB control unit 500 of the portable digital device 1000, and delivers the received data to the outer display control unit as shown in FIGS. 3 and 4. A embedded controller 930 controls an information exchange between the portable digital device 1000 and the outer display control unit 100.

Figure 9:
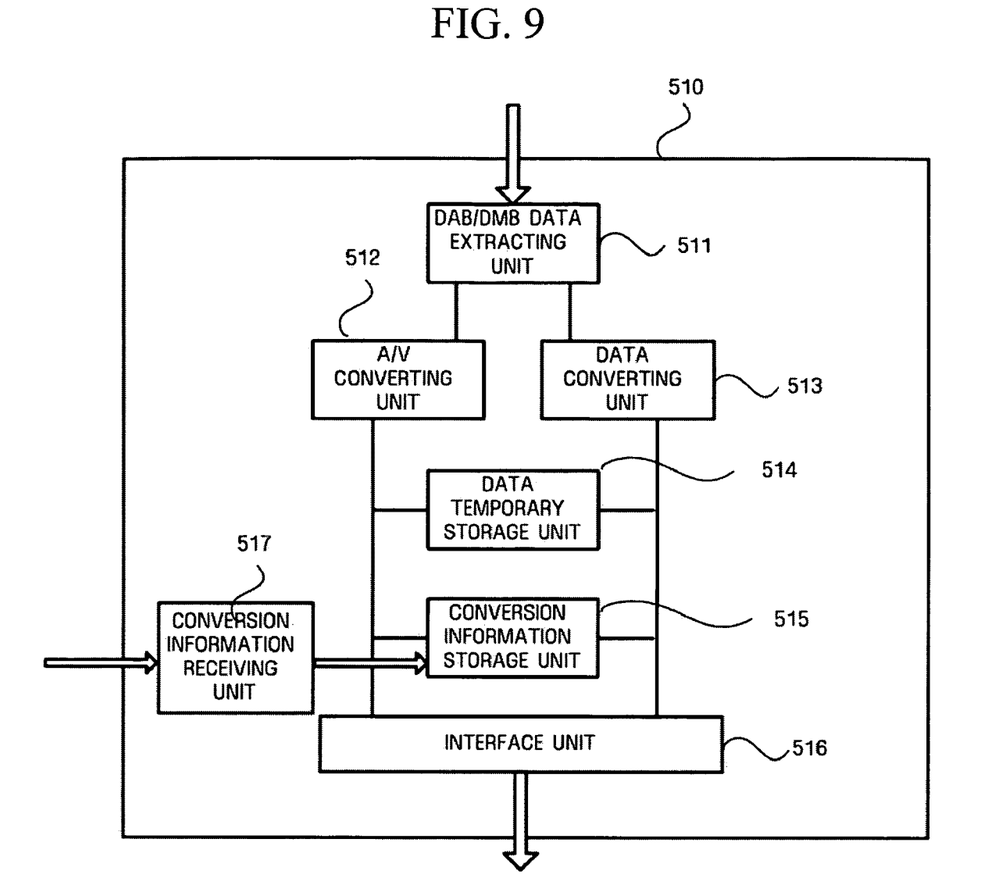
FIG. 9 is a block diagram illustrating the construction of digital broadcasting data converting unit according to the present invention.

FIG. 9 is a block diagram illustrating the construction of DAB/DMB data converting unit 510 as shown in FIG. 3 and FIG. 4. The outer display unit has a limited size, and thus it is difficult to display the digital broadcasting information on the outer display unit as it is. Only a part of A/V (Audio/Video) information that is the multimedia information of the digital broadcast can be displayed through the outer display unit, and the data information delivered through the data stream of the digital broadcast can be converted to match the outer display unit. The DAB/DMB data converting unit 510 performs such a conversion work.

A DAB/DMB data extracting unit 511 extracts data from the digital broadcasting signal delivered through the DAB/DMB processing unit. This data may be A/V data, broadcasting program information or information delivered through the data stream. The extracted A/V information is converted through an A/V converting unit 512, and the extracted data information is converted through a data converting unit 513.

The A/V converting unit 512 converts the A/V information to reduce the size of audio or video information as it shows a part of the A/V information or reduces the size of the data. Particularly, the video information may be converted so as to reduce the size of video frames or to show a part of the video frames. Information about such a conversion is stored in a conversion information storage unit 515 to be explained later.

The data converting unit 513 converts the format, location, and construction of the data to display the data on the outer display unit. For example, since the information about the broadcasting program can be displayed as general text information, it is necessary to convert the broadcasting program information into a form of a table as shown in FIG. 1 and FIG. 2 in order to display the information on the outer display unit. Also, the broadcasting program information may be converted so as to construct a user interface for enabling the outer input unit of the outer display control unit to generate the input signal. Information about such a conversion is also stored in the conversion information storage unit 515 to be explained later.

A data temporary storage unit 514 temporarily stores the data during the process of converting the data extracted from the A/V converting unit 512 and the data converting unit 513, or stores the conversion information if the conversion is performed with reference to the conversion information. This data temporary storage unit may be provided within the A/V converting unit 512 and the data converting unit 513.

The conversion information storage unit 515 has the information required for converting the A/V data and the information data through the A/V converting unit 512 and the data converting unit 513. The information stored in the conversion information storage unit refers to size to what the video information will be reduced, or in what ratio a part of the video frames will be selected in the event that only the part of the video frames will be displayed. In order to convert the program information or information delivered through the data stream, the conversion information storage unit has format information for converting the information to match the attributes of the information such as date, time, amount of traffic, broadcasting information, etc. The information can be defined by the user and then inputted through a conversion information receiving unit 517 to be stored.

The information converted by the A/V converting unit 512 and the data converting unit 515 may be delivered to the outer display unit through an interface 516, so that the user can recognize it.

Figure 10:
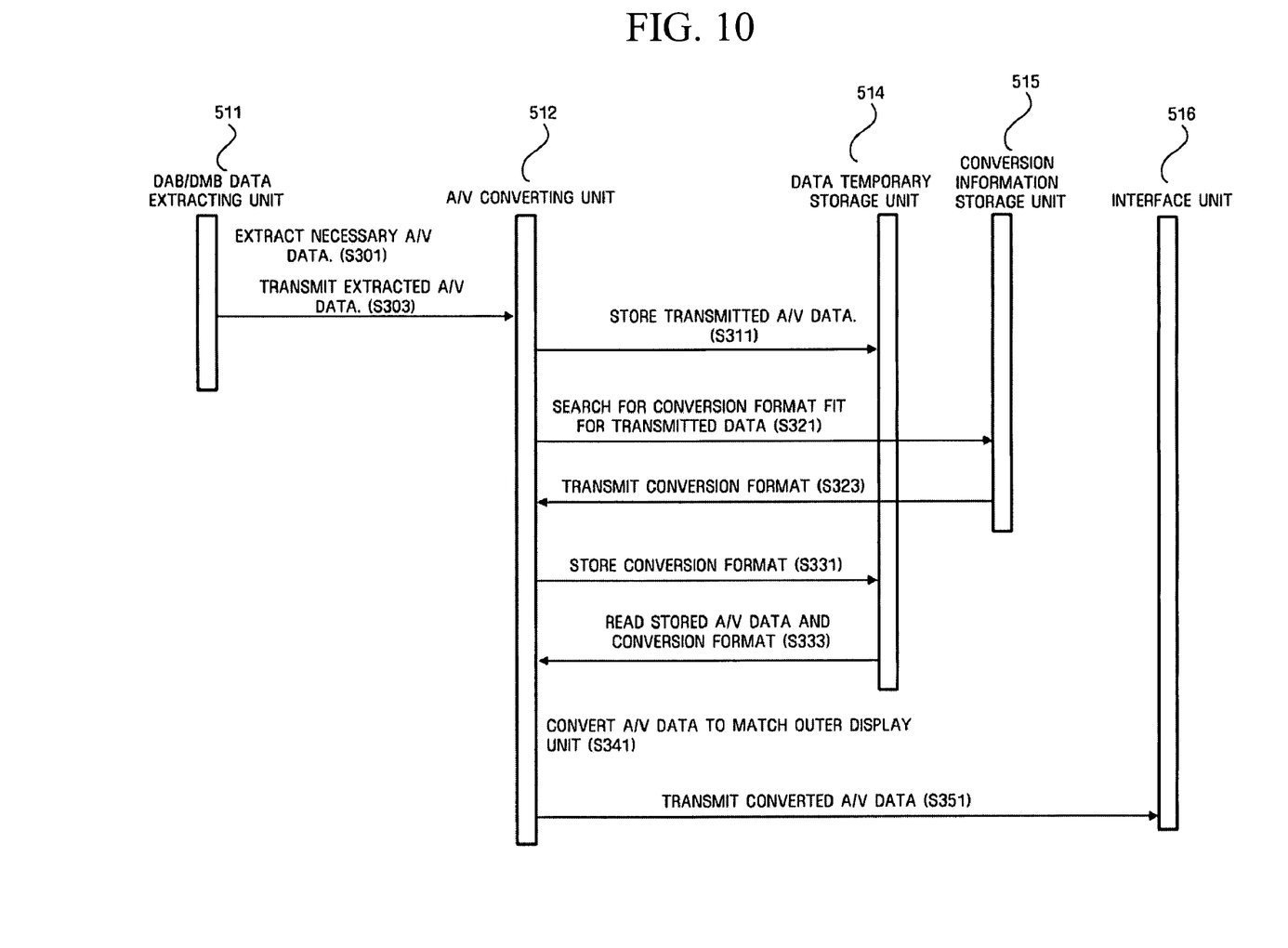
FIG. 10 is a flowchart illustrating a process of converting digital broadcasting information through a digital broadcasting data converting unit according to the present invention.

FIG. 10 is a flowchart illustrating a process of converting the digital broadcasting information through the DAB/DMB data converting unit as illustrated in FIG. 9 according to the present invention. In FIG. 10, the process of extracting and converting the A/V data is shown. However, any data other than the A/V data can also be processed in the same manner as shown in FIG. 10.

The data extracting unit 511, which has received the digital broadcasting signal through the DAB/DMB processing unit, extracts necessary A/V data from the digital broadcasting signal (operation S301). The extracted A/V data is delivered to the A/V converting unit for converting the A/V data (operation S303). Since the A/V converting unit requires the format information in order to convert the data, it temporarily stores the A/V data in the temporary storage unit 514 (operation S311), and then searches for the conversion format, which is the information about the A/V data, from the conversion information storage unit 515 (operation S321). If the information about the A/V data is searched, it may be the information about the converted size of the video frames or the information about a part of the video frames to be selectively displayed. This conversion of the video frames may be performed through the control of the video information or according to the encoded or compressed type of the corresponding video information.

The conversion information storage unit 515 delivers the conversion format of the A/V data to the A/V converting unit (operation S323), and the A/V converting unit stores the conversion format in the data temporary storage unit 514 (operation S331). After the data storage, the A/V converting unit reads the A/V data and the conversion format information from the data temporary storage unit 514 during the conversion process (operation S333), and converts the read A/V data and conversion format information to match the outer display unit (operation S341). Since the searched conversion information of the corresponding A/V data is fixed, the A/V converting unit stores the conversion information in the data temporary storage unit 514, and then converts the A/V data as it reads the conversion information from the data temporary storage unit 514.

Then, when the A/V converting unit delivers the converted A/V data to the interface unit 516 (operation S351), the interface unit 516 transmits the converted A/V data to the outer display control unit.

The portable digital device according to the above-described embodiment of the present invention can receive a digital broadcast without opening the apparatus and easily use information transmitted together with the digital broadcast.

Also, since the portable digital device according to the above-described embodiment of the present invention can receive the digital broadcast without driving the whole apparatus, it provides convenience in use with the power consumption reduced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A portable digital device comprising:
   a digital broadcast receiving unit to receive digital broadcasting information;
   a first display unit to output the received digital broadcasting information;
   a first input unit to control the first display unit,
   wherein the portable digital device is connected to a second display unit, remote from the first display unit, to output the received digital broadcasting information, and wherein the second display unit is controlled by a second input unit; and
   a digital broadcasting data converting unit to convert the received digital broadcasting information for display on the first display unit or the second display unit and to provide the converted digital broadcasting information to the first display unit or the second display unit,
   wherein the conversion of the digital broadcasting information is performed to match a user interface.

2. The portable digital device as claimed in claim 1, further comprising a digital broadcasting navigation code generating unit to generate a navigation code for a digital broadcast in accordance with an input signal of the second input unit.

3. The portable digital device as claimed in claim 2, wherein the digital broadcasting data converting unit transmits the converted digital broadcasting information to a remote controller having the second display unit, which is wirelessly connected to the portable digital device.

4. The portable digital device as claimed in claim 3, wherein the digital broadcasting navigation code generating unit generates the navigation code when a signal inputted through the remote controller is received.

5. The portable digital device as claimed in claim 1, wherein the digital broadcasting data converting unit selectively provides the converted digital broadcasting information to the first display unit or the second display unit.

6. The portable digital device as claimed in claim 1, wherein the first display unit and the second display unit are liquid crystal displays (LCDs).

7. The portable digital device as claimed in claim 1, wherein the digital broadcasting data converting unit includes:
   an A/V converting unit to convert the digital broadcasting information to match the second display unit when the digital broadcasting information is an audio/video signal;
   a data converting unit to convert the digital broadcasting information to match the second display unit when the digital broadcasting information is a data signal included in the broadcasting signal;
   a conversion information storage unit to store conversion information for performing the conversion through the A/V converting unit and the data conversion unit; and
   an interface to transmit the digital broadcasting information converted by the A/V converting unit and the data converting unit to the second display unit.

8. A method for providing digital broadcasting information, comprising:
   receiving digital broadcasting information;
   converting the received digital broadcasting information for display on display units; and
   providing the converted digital broadcasting information to a first display unit or a second display unit which is connected to the first display unit,
   wherein the first display unit is controlled by a first input unit,
   wherein the second display unit is controlled by a second input unit, and
   wherein the conversion of the digital broadcasting information is performed to match a user interface.

9. The method as claimed in claim 8, wherein the providing the converted digital broadcasting information includes:
   wirelessly transmitting the converted digital broadcasting information; and
   providing the wirelessly transmitted digital broadcasting information to the second display unit, the second display unit being a part of a remote controller.

10. The method as claimed in claim 8, wherein the conversion includes:
    generating a navigation code for the digital broadcasting information in accordance with an input signal that controls the second display unit; and
    changing the digital broadcast in accordance with the generated navigation code.

11. The method as claimed in claim 10, wherein the second display unit is part of a remote controller and the input signal is received by the remote controller.

12. A method of obtaining digital broadcasting information through an outer display of a device, comprising:

receiving a mode change request to a mode of an outer display control unit;

informing a Digital Multimedia Broadcasting/Digital Audio Broadcasting (DAB/DMB) control unit of a mode change according to the mode change request by transmitting to the DAB/DMB control unit a navigation code;

generating and transmitting output data for the navigation code to the outer display control unit;

displaying, after the generating and transmitting, the output data via a outer display;

determining, after the displaying, whether a button is input within a specified time period, determining whether the input button is an end button when the button is input within the specified amount of time, generating and transmitting another navigation code to the DAB/DMB control unit when the input button is not the end button; and performing a function corresponding to the navigation code and repeating the generating and transmitting, wherein, when no button is input within the specified time or the button is the end button, the method terminates.

13. The method of claim 12, wherein the output data for the navigation code is broadcasting information or data included in a broadcasting signal.

14. The method of claim 13, wherein the mode change request is received via a button manipulation, a touch screen, or remote controller.

15. The method of claim 13, wherein the mode change request is received via wireless communication.

16. The method of claim 13, wherein the mode change request is received at a time set by a timer.

17. The method of claim 13, wherein the digital broadcasting information received by the DAB/DMB control unit is also output to an outer speaker.

18. The method of claim 13, wherein the digital broadcasting information received by the DAB/DMB control unit is stored in a storage section of the device.

* * * * *